(12) United States Patent
Han et al.

(10) Patent No.: US 12,066,639 B2
(45) Date of Patent: *Aug. 20, 2024

(54) ADJUSTABLE ACHROMATIC COLLIMATOR ASSEMBLY FOR ENDPOINT DETECTION SYSTEMS

(71) Applicant: Applied Materials, Inc., Santa Clara, CA (US)

(72) Inventors: Pengyu Han, San Jose, CA (US); John Anthony O'Malley, San Jose, CA (US); Michael N. Grimbergen, Redwood City, CA (US); Lei Lian, Fremont, CA (US); Upendra Ummethala, Cupertino, CA (US); Michael Kutney, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,871

(22) Filed: Jun. 27, 2023

(65) Prior Publication Data

US 2023/0341699 A1   Oct. 26, 2023

Related U.S. Application Data

(63) Continuation of application No. 16/947,639, filed on Aug. 11, 2020, now Pat. No. 11,719,952.

(51) Int. Cl.
*G02B 27/30* (2006.01)
*G02B 9/12* (2006.01)
*G02B 27/00* (2006.01)

(52) U.S. Cl.
CPC ............. *G02B 27/30* (2013.01); *G02B 9/12* (2013.01); *G02B 27/005* (2013.01)

(58) Field of Classification Search
CPC ........ G02B 27/30; G02B 9/12; G02B 27/005; G02B 7/004
See application file for complete search history.

(56) References Cited

U.S. PATENT DOCUMENTS

| 6,381,021 | B1 | 4/2002 | Somekh et al. |
| 11,719,952 | B2 * | 8/2023 | Han ........................ G02B 27/30 359/641 |

(Continued)

FOREIGN PATENT DOCUMENTS

WO   2021067239 A1   4/2021

OTHER PUBLICATIONS

International Search Report and Written Opinion for related PCT application PCT/US2021/045362, dated Nov. 26, 2021; pp. 1-9.

*Primary Examiner* — James C. Jones
(74) *Attorney, Agent, or Firm* — LOWENSTEIN SANDLER LLP

(57) ABSTRACT

Implementations disclosed describe a collimator assembly having a collimator housing that includes an interface configured to optically couple to a process chamber that has a target surface, and a port to receive an optical fiber to deliver, to an enclosure formed by the collimator housing, a first (second) plurality of spectral components of light belonging to a first (second) range of wavelengths, and an achromatic lens located, at least partially, within the enclosure formed by the collimator housing, the achromatic lens to direct the first (second) plurality of spectral components of light onto the target surface to illuminate a first (second) region on the target surface, wherein the second region is substantially the same as the first region.

20 Claims, 10 Drawing Sheets

(56) References Cited

U.S. PATENT DOCUMENTS

| | | |
|---|---|---|
| 2006/0268423 A1 | 11/2006 | Ho |
| 2011/0204045 A1* | 8/2011 | Moffatt ................ B23K 26/083 219/121.74 |
| 2017/0343424 A1 | 11/2017 | Moffitt et al. |
| 2019/0094072 A1 | 3/2019 | Park et al. |

* cited by examiner

ADJUSTABLE ACHROMATIC COLLIMATOR ASSEMBLY FOR ENDPOINT DETECTION SYSTEMS

CROSS-REFERENCE TO RELATED APPLICATIONS

This application is a continuation application of co-pending U.S. patent application Ser. No. 16/947,639 filed Aug. 11, 2020, which is incorporated herein by reference.

TECHNICAL FIELD

This instant specification generally relates to fabrication of integrated circuits and other semiconductor devices in process chambers. More specifically, the instant specification relates to adjustable end-point detection systems for precise product control in device manufacturing.

BACKGROUND

Manufacturing of microelectronics and integrated circuit devices often involves performing numerous operations on semiconductor, dielectric and conductive substrates. Examples of these operations include oxidation, diffusion, ion implantation, thin film deposition, cleaning, etching, lithography, and so on. Materials manufactured in this manner may include monocrystals, semiconductor films, fine coatings, and numerous other substances used in electronic device manufacturing and other practical applications. As atoms of selected types are added (e.g., via deposition) to substrates or removed (e.g., via etching) from the substrates, efficient and precise endpoint monitoring techniques (and systems) become valuable. Under-etching, as well as over-etching (and similarly, under-deposition and over-deposition), may result in substandard and even malfunctioning devices. Optical control systems, which allow real-time monitoring of various stages of device manufacturing, significantly improve quality of the products. This is especially useful given that the demands to the quality of semiconductor devices are constantly increasing.

SUMMARY

In one implementation, disclosed is a collimator assembly that includes a collimator housing and an achromatic lens. The collimator housing includes an interface configured to optically couple to a process chamber that has a target surface and a port to receive an optical fiber. The optical fiber is to deliver, to an enclosure formed by the collimator housing, a first plurality of spectral components of light that belong to a first range of wavelengths and a second plurality of spectral components of light belonging to a second range of wavelengths. The first range is within a 400-700 nm interval of wavelengths, and the second range is outside the 400-700 nm interval of wavelength. The achromatic lens is located, at least partially, within the enclosure formed by the collimator housing. The achromatic lens is to direct the first plurality of spectral components of light onto the target surface to illuminate a first region on the target surface. The achromatic lens is further to direct the second plurality of spectral components of light onto the target surface to illuminate a second region on the target surface so that the second region is substantially the same as the first region.

In another implementation, disclosed is an endpoint detection system that includes a source of light, a collimator housing, an achromatic lens, a light detector, and a processing device. The source of light is to output a first plurality of spectral components of light belonging to a first range of wavelengths and a second plurality of spectral components of light belonging to a second range of wavelengths. The first range is within a 400-700 nm interval of wavelengths, and the second range is outside the 400-700 nm interval of wavelength. The collimator housing includes an interface configured to optically couple to a process chamber that has a target surface. The collimator housing also includes a port to receive an optical fiber to deliver, to an enclosure formed by the collimator housing, the first plurality of spectral components of light belonging to a first range of wavelengths and the second plurality of spectral components of light belonging to a second range of wavelengths. The achromatic lens is located, at least partially, within the enclosure formed by the collimator housing. The achromatic lens is to direct the first plurality of spectral components of light onto the target surface to illuminate a first region on the target surface, and direct the second plurality of spectral components of light onto the target surface to illuminate a second region on the target surface, so that the second region is substantially the same as the first region. A second optical fiber is to collect a first plurality of reflected, from the target surface, spectral components of light produced by the first plurality of spectral components of light directed onto the target surface. The second optical fiber is further to collect a second plurality of reflected, from the target surface, spectral components of light produced by the second plurality of spectral components of light directed onto the target surface. The light detector to receive, via the second optical fiber, the first plurality of reflected spectral components of light and the second plurality of reflected spectral components of light. The processing device, communicatively coupled to the light detector, is to determine reflectance of the target surface, based on the received first plurality of reflected spectral components of light and the received second plurality of reflected spectral components of light.

In another implementation, disclosed is a method to output, by a source of light, a first plurality of spectral components of light belonging to a first range of wavelengths and a second plurality of spectral components of light belonging to a second range of wavelengths. The first range is within a 400-700 nm interval of wavelengths, and the second range is outside the 400-700 nm interval of wavelength. The method disclosed is further to direct, through an achromatic lens, the first plurality of spectral components of light onto a target surface to cause a first region on the target surface to be illuminated. The method disclosed is further to direct, through the achromatic lens, the second plurality of spectral components of light onto the target surface to cause a second region on the target surface to be illuminated, so that the second region is substantially the same as the first region. The method disclosed is further to collect, by a second optical fiber, a first plurality of reflected, from the target surface, spectral components of light produced by the first plurality of spectral components of light directed onto the target surface. The method disclosed is further to collect, by the second optical fiber, a second plurality of reflected, from the target surface, spectral components of light produced by the second plurality of spectral components of light directed onto the target surface. The method disclosed is further to receive, by a light detector, via the second optical fiber, the first plurality of reflected spectral components of light and the second plurality of reflected spectral components of light. The method disclosed is further to determine, by a processing device communicatively coupled to the light detector, a reflectance of the target surface, based on the received first plurality of reflected spectral components of light and the received second plurality of reflected spectral components of light.

DETAILED DESCRIPTION

Figure 1:
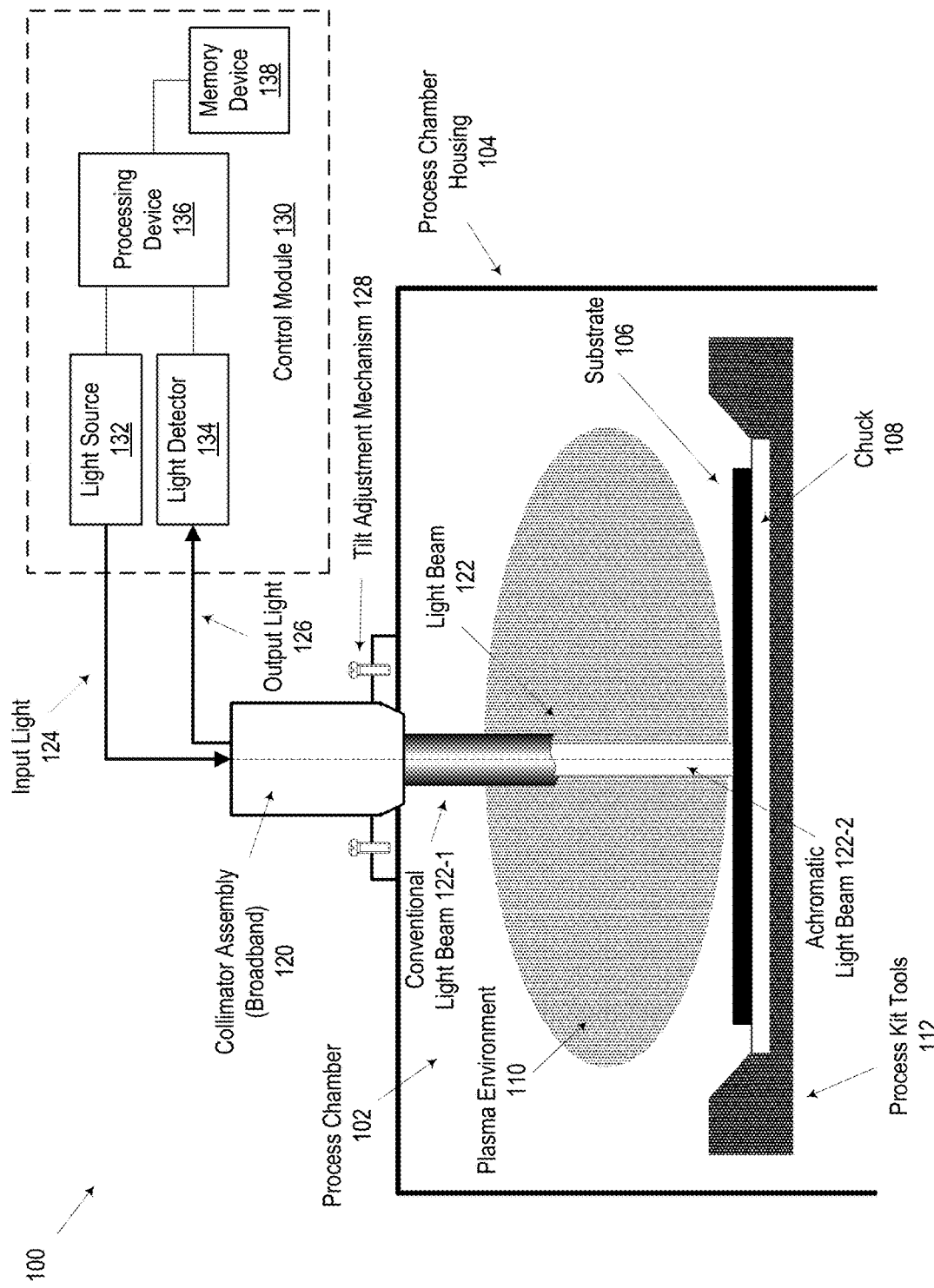
FIG. 1 illustrates schematically a manufacturing machine that includes a spatially adjustable broadband collimator assembly, for precise optical characterization of targets within a process chamber, in accordance with some implementations of the present disclosure.

The implementations disclosed herein provide for accurate broadband optical endpoint control of semiconductor device manufacturing. The implementations provide for a delivery, into a process chamber, of a beam of light that has a uniform spatial profile for a broad range of wavelengths. For example, the width of the beam may be the same for a 250 nm spectral component of the beam as for a 750 nm spectral component of the beam. The spatial uniformity of the beam can be achieved by delivering a light signal through a collimator equipped with a broadband achromatic lens. This enhanced uniformity ensures a more accurate measurement (compared with a collimator deploying conventional optical elements) of the optical response of a target (such as a substrate) inside the process chamber, and, therefore, a more accurate determination of the state of the target (e.g., during substrate etching or deposition processing).

The collimator may be further equipped with a precision adjustment mechanism to adjust an alignment of the optical axis of the collimator, for maximizing the efficiency of the incident light delivery to an intended region on the target located within the process chamber. In some implementations, after maintenance of the process chamber is performed, the adjustment mechanism may be used to compensate for small differences in positions of the processing tools (such as a variation in positioning of a chuck for wafer support) caused by disassembly, reassembly, and/or recalibration of the tools.

During electronics device manufacturing, a number of pattern transfer operations, including lithography and etching, are often performed. For example, in the lithographic step, a photoresist layer partially protected with a photomask (containing the desired pattern) may be exposed to a light source and subsequently developed in a suitable chemical solution to remove exposed unprotected portions of the photoresist. The resulting patterned photoresist layer may then be used, in the etching step, as a mask to protect a substrate (such as a silicon wafer) exposed to a reactive (e.g. wet or dry etching) environment to remove the unprotected portions of the substrate. During etching, endpoint data from the substrate (such as optical response data, which may include reflectance data, polarization data, and so on) may be used to determine whether the process is operating according to specifications, and whether the desired results such as etch depth and uniformity are achieved.

Changes in the reactive environment (such as composition, temperature, density of plasma) and differences in photomask patterns may result in variations in the speed and uniformity of etching. Tracking and responding to such changes may involve precise and adjustable optical endpoint systems capable of collecting accurate and substantial optical response data characterizing various target surfaces (wafers, photomasks, and the like) within the process chambers. The goal of accuracy is further driven by ever-decreasing dimensions of microelectronic devices, increasingly complex designs of photomasks, and the raising demands for device uniformity. The existing optical systems for endpoint control are often incapable of meeting such increased technological demands.

Aspects and implementations of the present disclosure address this and other shortcomings of the optical inspection technology that may be used in substrate manufacturing. Described herein is a spatially adjustable optical inspection device capable of delivering a beam of light with a uniform spatial profile within a broad range of wavelengths, for precise optical characterization of substrate processing. The implementations disclosed herein help to accurately determine optical, physical, and/or morphological properties of the substrates, such as the substrates' uniformity, smoothness, thickness, refractive index, reflectivity, and so on, and provide an efficient quality control tool that does not call for slowing down the manufacturing process.

The disclosed implementations pertain to a variety of manufacturing techniques that use process chambers (that may include deposition chambers, etching chambers, and the like), such as chemical vapor deposition techniques (CVD), physical vapor deposition (PVD), plasma-enhanced CVD, plasma-enhanced PVD, sputter deposition, atomic layer CVD, combustion CVD, catalytic CVD, evaporation deposition, molecular-beam epitaxy techniques, and so on. The disclosed implementations may be employed in techniques that use vacuum deposition chambers (e.g., ultrahigh vacuum CVD or PVD, low-pressure CVD, etc.) as well as in atmospheric pressure deposition chambers.

FIG. 1 illustrates schematically a manufacturing machine 100 that includes a spatially adjustable broadband collimator assembly, for precise optical characterization of targets within a process chamber, in accordance with some implementations of the present disclosure. In one implementation, the manufacturing machine 100 includes a process chamber 102 inside a process chamber housing 104 for processing (e.g., deposition, lithography, etching, and the like) of one or more substrates 106. During processing, the substrate 106 may be exposed to a plasma environment 110 for plasma-enhanced processing, e.g., etching. The substrate 106 may be supported by a chuck 108. The process chamber 102 may include one or more process kit tools 112, such as an edge ring or the like. The substrate 106 may be lifted by lift pins (not shown) to achieve a target exposure of the back surface of the substrate 106 to the processing environment, to heat the substrate 106 (e.g., by directing light thereon), and so on.

The processing of the substrate 106 in the process chamber 102 can be optically monitored by an endpoint optical system that includes a collimator assembly 120 and a control module 130. The collimator assembly 120 may be mechanically coupled to the process chamber housing 104 (rigidly or operatively, as explained in more detail below) and may be optically interfaced with the environment of the process chamber 102, such as the plasma environment 110. The optical interface between the collimator assembly 120 and the process chamber 102 may be an orifice, a converging or diverging lens, a transparent slab (which may have no optical power), a polarizer, or any other device or material that is capable of transferring light between the collimator assembly 120 and the process chamber 102. Herein, "light" refers to electromagnetic radiation of any spectral range, including visible, far and near infrared (IR), far and near ultraviolet (UV), etc. "Light" may further include unpolarized (e.g., natural) light, linearly, circularly, or elliptically polarized light, partially-polarized light, focused light, diverging light, collimated light, and so on.

The light beam 122 can be produced by the collimator assembly 120 from in input light 124 generated by a light source 132. In some implementations, the input light 124 is delivered via one or more input optical fiber(s). The light source 132 may be a narrow-band light source, such as a light-emitting diode, a laser, a light bulb, etc. In some implementations, the light source 132 is a broadband light source. In some implementations, the light source 132 includes more than one component light sources, such as multiple narrow-band light sources producing (when taken together) a broadband input light 124. The light source 132 may include additional optical elements to control a spectral distribution and/or polarization of the input light 124 (such as filters, absorbers, polarizers, etc.).

In some implementations, the input light 124 is converted by the collimator assembly 120 into the light beam 122, e.g., by making the input light 124 pass via a plurality of optical elements of the collimator assembly 120, such as lenses, reflectors, filters, apertures, and so on. The collimator assembly 120 may have broadband properties. More specifically, the collimator assembly 120 may produce (as described in more detail below) the light beam 122 whose spatial extent may be the same for multiple spectral component of the beam. For example, a diameter of the produced light beam 122 may be the same within a broad range of wavelengths $\lambda$ of various spectral components contained in the input light 124 and, therefore, in the light beam 122. In existing endpoint detection systems, the diameter of the conventional light beam 122-1 varies depending on the wavelength $\lambda$. For example, a green component ($\lambda=550$ nm) may have a diameter of 9 mm whereas a red component ($\lambda=650$ nm) may have a diameter of 13 mm. (This is illustrated schematically in FIG. 1 with the varying shading in the depiction of the conventional light beam 122-1.) As a result, different spectral components propagate along different optical paths. This can result in a significant error in the obtained reflectivity $R(\lambda)$ of the substrate, which may, therefore, lead to mischaracterization of the target (e.g., the surface of the substrate 106) and to errors in the etching process (such as causing the etching to be stopped too early or too late).

In contrast, the implementations of the present disclosure describe broadband collimator assembly 120 that ensures a substantially the same spatial extent of various spectral components $\lambda$ of the light beam 122. This is illustrated schematically in FIG. 1 with the uniformly white cross section of the achromatic beam 122-2. To achieve an output of such broadband achromatic light beam, the collimator assembly 120 may have one or more achromatic lenses, as described in more detail below, in reference to FIG. 2. More specifically, the achromatic beam 122-2 may be characterized by specifying the beam's spectral content for multiple spectral ranges $\Delta\lambda$, such as spectral ranges of width $\Delta\lambda=100$ nm (or 150 nm, 200 nm or any other range of wavelengths). The spectral ranges may be centered at a sequence of central wavelengths $\lambda_1, \lambda_2, \lambda_3 \ldots$. In some implementations, the ranges are overlapping with $\Delta\lambda$ being greater than the distance between the adjacent central wavelengths. In some implementations, $\Delta\lambda$ is equal to the distance between the central wavelengths (e.g., $\Delta\lambda=23-22$). In some implementations, $\Delta\lambda$ is greater than the distance between the central wavelengths (so the ranges are non-overlapping). In some implementations, the ranges $\Delta\lambda$ has unequal width. (Alternatively, the ranges may correspond to equal frequency intervals, $\Delta f$.) In some implementations, the ranges $\Delta\lambda$ correspond to actual emission ranges of various light emitters of the light source 132 (e.g., emission ranges of light-emitting diodes of the light source 132). In other implementations, the ranges $\Delta\lambda$ are defined for characterization purposes only and may not be restricted to any specific physical light emitters.

The spectral components within the range $\Delta\lambda_k$ centered around $\lambda_k$ may propagate in the form of a spectral beam of some diameter $d_k$. (For the sake of conciseness, the beams will be described as having circular cross sections. However, it shall be understood that similar characterization can be made for beam of any other cross sections, such as elliptic beams or beams having some other shape.) The k-th spectral beam may illuminate a k-th region $A_k$ on the target surface (e.g., surface of the substrate 106). The notation $A_k$ may stand for the area of the illuminated region or to some other geometric characteristic of the illuminated region. The diameter and/or the area of the k-th illuminated region may be defined using any suitable scheme, as long as the same scheme is used across various spectral ranges. For example, a half-width or a full width of a continuous distribution of the k-th spectral beam intensity may be used to determine the diameter $d_k$. In some implementations, to be substantially the same, two illuminated regions $A_k$ and $A_m$ are to have an overlap of at least 90% (or 85%, 95%). That is, the part of the region $A_k$ that falls outside the region $A_m$ (and vice versa is to be less that 10% (or 15%, 5%) of the region $A_k$.

In some implementations, to possess achromatic broadband properties, the collimator assembly 120 is to produce at least two spectral beams that illuminate substantially the same regions on the target surface. In some implementations, for the collimator assembly 120 to have achromatic broadband properties, the two spectral beams correspond to the ranges that are separated by at least 200 nm center-to-center wavelength separation. In some implementations, to possess achromatic broadband properties the collimator assembly 120 is to produce at least three spectral beams that illuminate substantially the same regions on the target surface. In some implementations, the three spectral beams correspond to the ranges that are separated by at least 400 nm wavelength separation between the centers of the two outermost ranges.

The light reflected off the target surface may pass through the collimator assembly 120 in the reverse direction and be collected by one or more second optical fiber(s). The second optical fiber may deliver this output light 126 to a light detector 134 for spectral analysis. The light detector 134 may include one or more spectrographs, spectrometers, diffraction gratings, mirrors, lenses, photodiodes, and other devices. The light detector 134, alone or in conjunction with a processing device 136 (e.g., a central processing unit (CPU), a microcontroller, an application-specific integrated circuit (ASIC), a digital signal processor (DSP, a field-programmable gate array (FPGA), or any other type of a processing device), may determine one or more optical responses of the target. The optical responses may include the reflectivity $R(\lambda)$, the refraction index $n(\lambda)$, or any other optical quantity that may be used to characterize the substrate, such as a polarization dependence of the reflectivity, an angle of rotation of the polarization plane upon reflection, luminescence intensity, and so on.

The processing device 136 may be in communication with a memory device 138. In some implementations, the memory device 138 stores instructions that the processing device 136 is to execute to cause the light source 132 to produce the input light 124, to cause the light detector 134 to perform detection of the output light 126, and to perform any further operations that may be needed for substrate processing. Such operation may include starting, stopping, and/or resuming etching, lithography, or deposition operations. The processing device 136 may be the same processing device that controls the operations in the process chamber 102 or a separate dedicated processing device of the endpoint detection system.

In some implementations, the collimator assembly 120 is equipped with a tilt adjustment mechanism 128 to allow adjustment of the optical axis (depicted with a dashed line in FIG. 1) of the collimator to facilitate centering (or re-centering) of the collimator after maintenance or to ensure chamber-to-chamber consistency, when the collimator assembly 120 is being moved to different process chamber. In some implementations, as described below in reference to FIGS. 4-6, the tilt adjustment mechanism 128 includes one or more adjustment screws that facilitate a configurable connection between the collimator assembly 120 and the process chamber housing 104.

Figure 2:
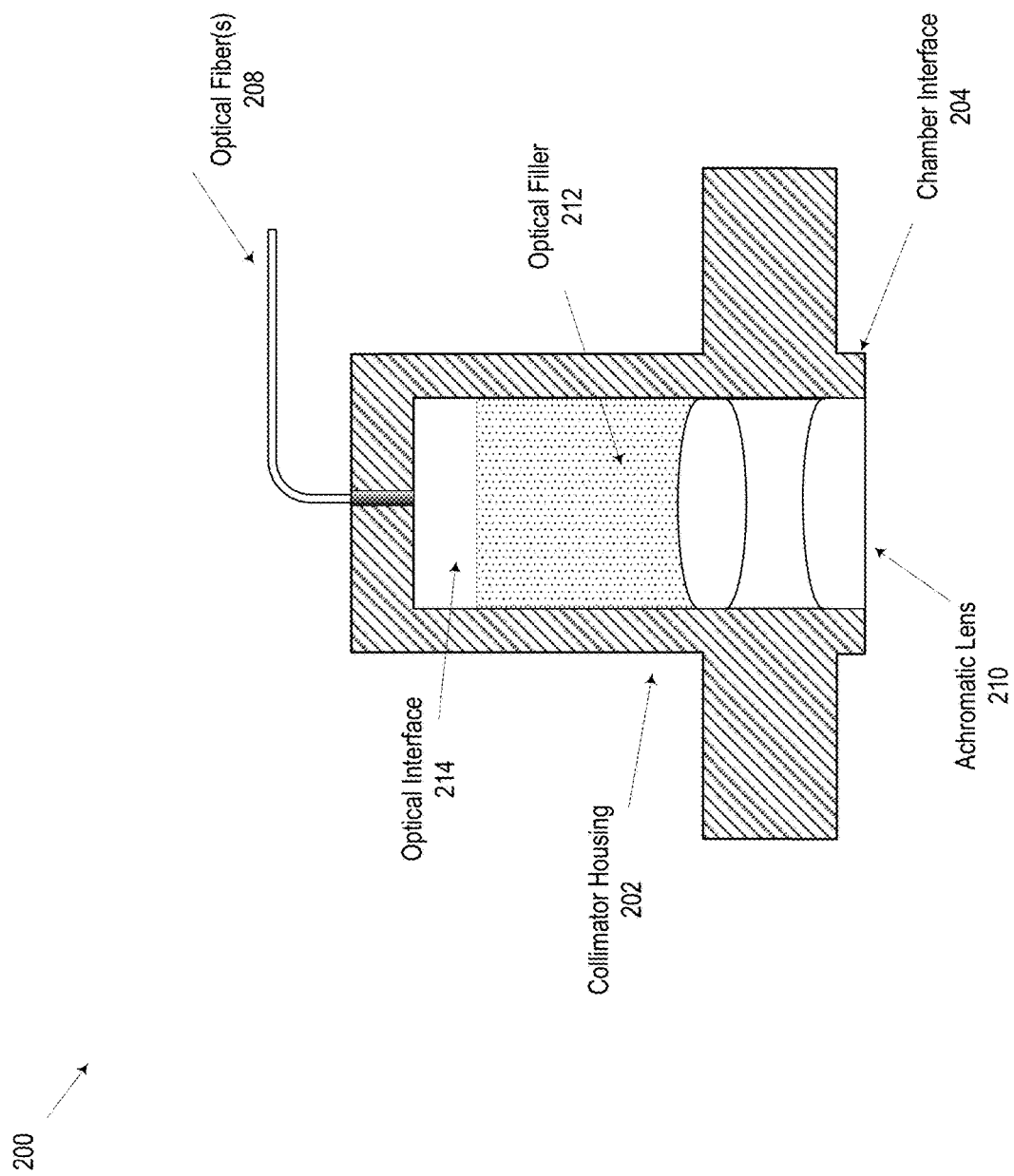
FIG. 2 illustrates schematically an exemplary achromatic (broadband) collimator assembly, for precise optical characterization of targets within a process chamber, in accordance with some implementations of the present disclosure.

FIG. 2 illustrates schematically an exemplary achromatic (broadband) collimator assembly 200, for precise optical characterization of targets within a process chamber, in accordance with some implementations of the present disclosure. FIG. 2 is not drawn to scale and is intended as a schematic depiction only. Some elements shown in FIG. 2 may be omitted in various implementations. Some additional elements, known to a person skilled in the optical detection technology may not be shown in FIG. 2 for clarity and conciseness, but may actually be present in various implementations. In some implementations, the collimator assembly 200 corresponds to the collimator assembly 120 of FIG. 1. The collimator assembly 200 may have a collimator housing 202. The collimator housing 202 may have a chamber interface 204 for coupling of the collimator assembly 200 to a process chamber (such as the process chamber 102). The chamber interface 204 may be permanently fused with the collimator housing 202 or may be an extension of the collimator housing 202, in some implementations. In some implementations, the chamber interface 204 is removably attached to the collimator housing 202 by a thread, or held to the collimator housing by friction, or retention screws, pins, detents, and the like. The chamber interface 204 may fit to a receiving orifice in the process chamber housing 102 and may be sealed (by one or more gas-proof seals or gaskets) to the receiving orifice to prevent escape of gases from the environment of the process chamber. In some implementations, the chamber interface 204 is sealed to the orifice in the process chamber housing 102 with the seal(s) allowing the axis of the collimator housing 202 to be tilted away from the vertical direction within set limits, but without breaking the isolation of the environment inside the process chamber 102 from the outside atmosphere.

The collimator housing 202 may define an enclosure to host various optical elements of the collimator assembly 200, such as an achromatic (broadband) lens 210, an optical filler 212, an optical interface 214, and so on. As depicted, the top of the collimator housing 202 may have an opening to guide one or more optical fibers 208 (to deliver the input light 124 and/or to receive the output light 126) via a conduit in the guiding cap. In some implementations, the optical fiber(s) 208 may access the enclosure of the collimator assembly differently, e.g., through a sidewall of the housing 202. The optical interface 214 may include an opening, a waveguide, a lens, and so on. The optical interface 214 may be configured to allow passage of light but prevent access of contaminants. For example, upon exiting the optical fiber 208, the input light 124 may pass through a slab (film) of an optically transparent material or a diverging (converging) lens, which mechanically seals the conduit of the optical fiber.

The achromatic lens 210 may be a broadband lens designed to minimize chromatic aberration for a wide range of wavelengths. For example, the achromatic lens 210 may have multiple lenses made of different materials, with some of the materials having a higher dispersion of the refractive index and some of the materials having a lower dispersion. In some implementations, the achromatic lens 210 may be a doublet lens having two optical elements (e.g., a converging lens and a diverging lens). In some implementations, as depicted in FIG. 2, the achromatic lens 210 may be a triplet lens having three optical elements. In some implementations, the achromatic lens 210 may have more than three optical elements. The achromatic lens 210 may be designed for two, three, or more, reference wavelengths $\Lambda_1, \Lambda_2, \Lambda_3$ . . . to have the same focus (some or all of the reference wavelength may be the central wavelengths used for characterization of the light beam 122, as described in reference to FIG. 1). This may ensure that the chromatic aberration remains small even for wavelengths that fall between the reference wavelengths. The focusing distance(s) of various elements of the achromatic lens 210 may be so chosen that the input light delivered via the optical fiber(s) 208 becomes a collimated beam after passing through the achromatic lens 210. In other implementations, the (properly chosen) distance between the optical fiber 208 and the achromatic lens 210 may be used to ensure that the output beam (e.g., the beam 122-2) is collimated. In some implementations, one or more lens of the optical interface 214 facilitates collimation.

In some implementations, the achromatic lens 210 is held within the collimator housing 202 by a retaining ring. In some implementations, the achromatic lens is screwed into a threated part of the collimator housing 202. In some implementations, the achromatic lens 210 is frictionally held by the collimator housing 202. For example, the diameter of the achromatic lens 210 may be precisely tailored to the inner diameter of the enclosure formed by the collimator housing 202 so that the lens remains under lateral tension sufficient to generate enough friction to hold the lens securely in place. In some implementations, the space between the achromatic lens 210 and the optical interface 214 is filled with a transparent optical filler 212 to ensure optical path consistency (e.g., to minimize the presence of air, moisture, and other possible contaminants along the optical paths of the input and output light signals).

FIG. 3 illustrates schematically advantages of using achromatic (broadband) collimators for precise optical characterization of targets within a process chamber, in comparison with a conventional collimator, in accordance with some implementations of the present disclosure. Shown in FIG. 3A are depictions of reflectivity $R(\lambda)$ data for a reference substrate obtained for a continuum of wavelengths $\lambda$ ranging from near-UV to near-IR (such as a range of 200-800 nm, in one example). The measured data illustrated schematically in FIG. 3A is obtained using a conventional collimator that does not deploy an achromatic lens. The dashed line indicates a reference reflectance of the same reference substrate obtained by high-precision reflectance measurements in a laboratory setting using high-grade light sources and light detection spectrometers. The solid line in FIG. 3A illustrates data obtained using a conventional collimator that produces a beam (such as the beam 122-1) whose spatial extent is not controlled for different wavelengths. As the comparison of the two curves indicates, while the measured reflectance is reasonably close to the exact reference reflectance in the UV range and the blue part of the visible range, the accuracy deteriorates significantly in the red part of the visible spectrum and becomes poor in the IR range.

Figure 3A:
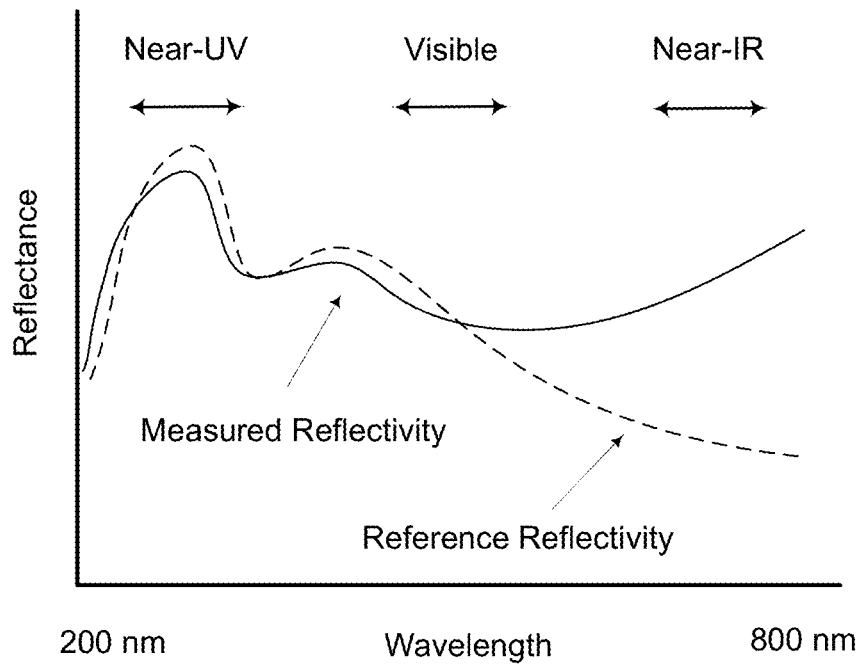
FIGS. 3A-D illustrate schematically advantages of using achromatic (broadband) collimators for precise optical characterization of targets within a process chamber, in comparison with a conventional collimator, in accordance with some implementations of the present disclosure.
Figure 3B:
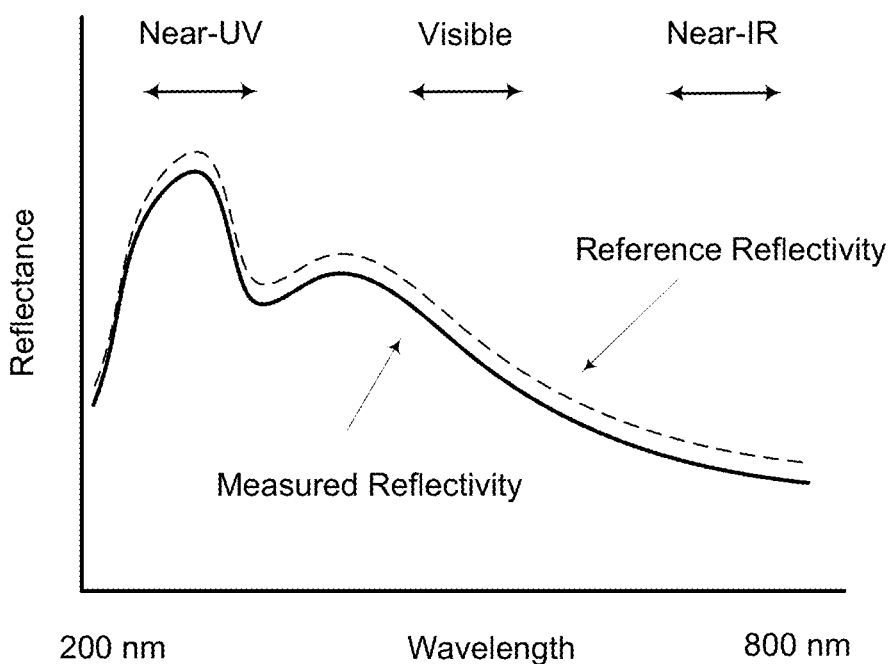

Shown in FIG. 3B are results of measurement of the reflectance $R(\lambda)$ for the same reference substrate using a broadband collimator with an achromatic lens, as described above in reference to FIGS. 1-2. The improvement illustrated in FIG. 3B arises from illuminating the target substrate with a beam (such as the beam 122-2) having substantially the same spatial extent for the entire continuum of wavelengths $\lambda$ used in the target characterization. The following table illustrates the improvement in the beam uniformity for several wavelengths.

| Collimator type | Beam diameter (in arbitrary units d) | | |
|---|---|---|---|
| | 250 nm (near-UV) | 550 nm (green) | 750 nm (near IR) |
| Conventional | 0.5d | d | 1.5d |
| Broadband | d | d | d |

The improved beam uniformity contributes to a better accuracy in determination of the reflectivity $R(\lambda)$. Because of the more accurate measurements of the reflectivity, the processing device 136 may be capable of a precise determination of the current state of the process operation (deposition, etching, and the like) performed on actual substrates in the process chamber 102.

Figure 3C:
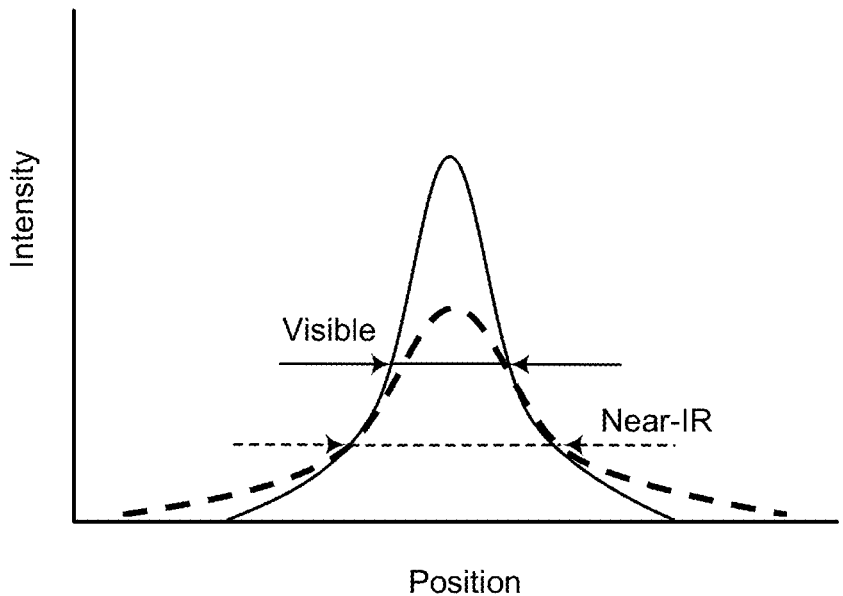
Figure 3D:
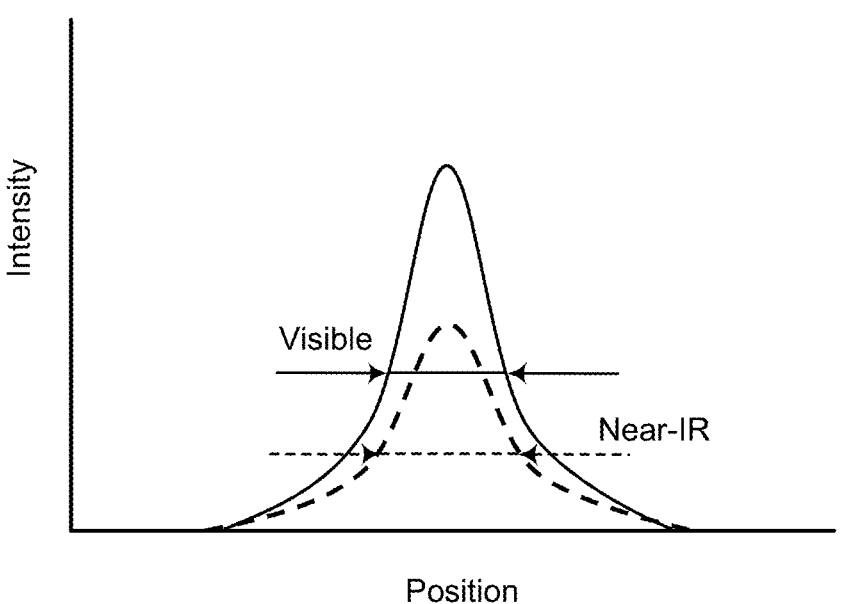

Shown in FIG. 3C is a depiction of a spatial extent of a conventional beam (such as the beam 122-1) having two exemplary spectral components, indicated as visible light (e.g., 550 nm) and near-IR light (e.g., 750 nm). The position indicated by the horizontal axis may be a radial distance from the center of the beam. As depicted, the spatial extent (e.g., the distance corresponding to a half-width of the beam) of the two spectral components may differ significantly. In contrast, shown in FIG. 3D is a depiction of a spatial extent of a beam (such as the beam 122-2) output by a broadband collimator assembly (e.g., assembly 120), for the same two spectral components. As depicted, the spatial extent of the two spectral components is substantially the same.

Figure 4:
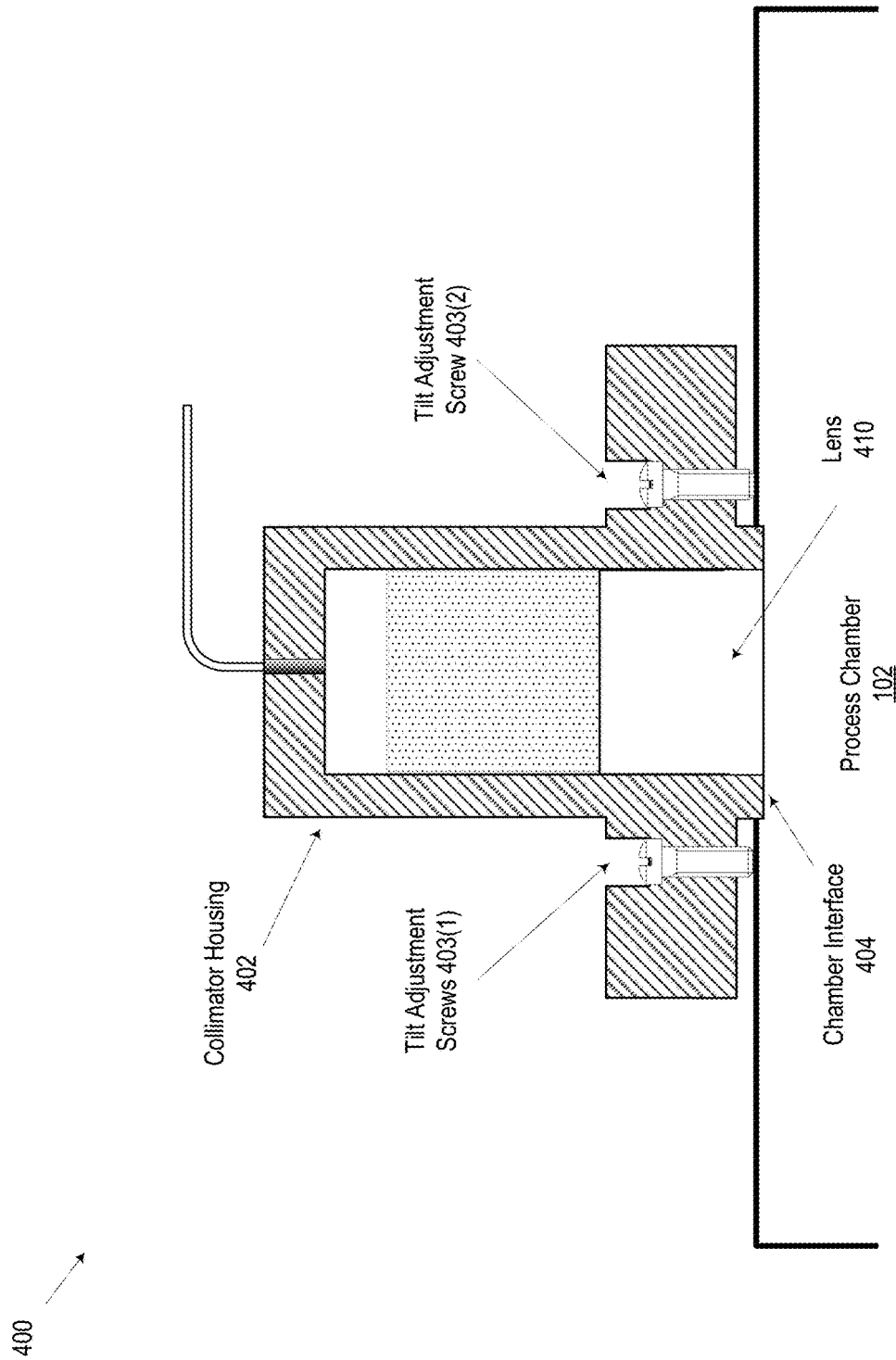
FIG. 4 illustrates schematically an exemplary collimator assembly having adjustable alignment, for precise optical characterization of targets within a process chamber, in accordance with some implementations of the present disclosure.

FIG. 4 illustrates schematically an exemplary collimator assembly 400 having adjustable alignment, for precise optical characterization of targets within a process chamber, in accordance with some implementations of the present disclosure. FIG. 4 is not drawn to scale and is intended as a schematic depiction only. Some elements shown in FIG. 4 may be omitted in various implementations. Some additional elements, known to a person skilled in the optical detection technology may not be shown in FIG. 4 for clarity and conciseness, but may actually be present in various implementations. In some implementations, the collimator assembly 400 may be the collimator assembly 200 of FIG. 2. The collimator assembly 400 may be configured to optically couple to a process chamber (such as the process chamber 102). The collimator assembly 400 may include a collimator housing 402. The collimator housing 402 may have a chamber interface 404 for coupling to the process chamber. The chamber interface 404 may allow a degree of variability (within set limits) in the direction of the collimator axis (which may also be the optical axis of the collimator contained within the enclosure formed by the collimator housing 402).

Figure 5:
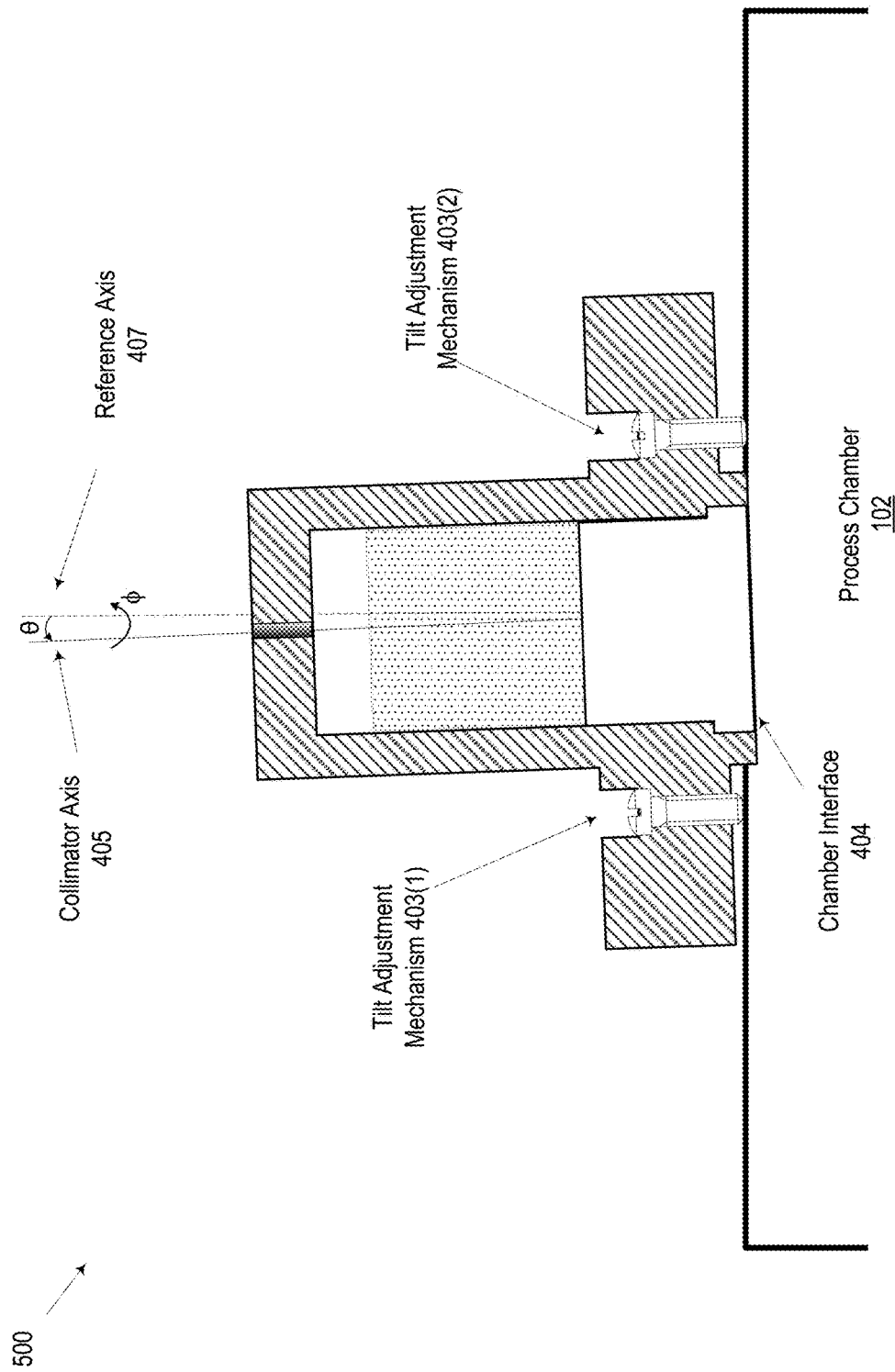
FIG. 5 illustrates schematically a tilted exemplary collimator assembly having adjustable alignment, for precise optical characterization of targets within a process chamber, in accordance with some implementations of the present disclosure.

FIG. 5 illustrates schematically a tilted exemplary collimator assembly 500 having adjustable alignment, for precise optical characterization of targets within a process chamber, in accordance with some implementations of the present disclosure. As shown in FIG. 5, the collimator axis 405 may be tilted to angle θ from a reference axis 407 (shown by the dashed line). Depicted in FIG. 5 is the vertical reference axis 407, but in various implementations, the orientation of the reference axis may have any other suitable direction. For example, in some implementations, where the collimator assembly 400 is coupled to a sidewall of the process chamber 102, the reference axis may be horizontal. The tilt angle shown in FIG. 5 is exaggerated for the ease of illustration. In some implementations, the maximum tilt angle may be 1° (or some a fraction of 1°). In some implementations, the tilt angle may be greater than 1° and may be limited by a number of factors, such as an anticipated need for large tilt angles and the ability of a given chamber interface 404 to maintain proper gas seal with the process chamber 102.

In some implementations, the tilt adjustment mechanism include one or more adjustment mechanism 403 to control tilt (alignment) of the collimator axis 405. "Adjustment mechanism" herein means any mechanical device (such as a screw, a bolt, a lever, a wedge, and the like), or a combination of mechanical devices, that is capable of converting rotational motion of a control head (e.g., the head of a screw, a knob, etc.) into a parallel motion of a mechanical member (such as a shaft of the screw, a spring, a wedge, etc.). The mechanical member may interface between a movable part of the collimator housing 402 and a stationary part of the collimator housing. In some implementations, the mechanical member interfaces directly between the movable part of the collimator housing 402 and the process chamber housing 104 (or any part attached thereto). In some implementations, for precise control of the collimator tilt angle θ, the adjustment mechanism 403 may be outfitted with micrometer heads or any other devices that provide a suitable feedback about the tilt angle and allow reproducible adjustment of the collimator assembly 400.

Because, geometrically, any three arbitrarily placed points define a plane, the number of adjustment mechanism 403 is three, in some implementations. In some implementations, the number of adjustments mechanism 403 is less than three. For example, the adjustment screw 403(1) may be replaced with a non-adjustable screw (or a pin) that maintains a fixed contact with the process chamber housing, whereas the adjustment mechanism 403(2) and 403(3) (not shown in FIGS. 4-5) may nonetheless allow a fully adjustable tilt control. As a result, the collimator axis 405 may still be tilted in two directions, allowing both the tilt θ of the collimator axis away from the reference axis 407 as well as an azimuthal rotation ϕ around the reference axis.

Figure 6:
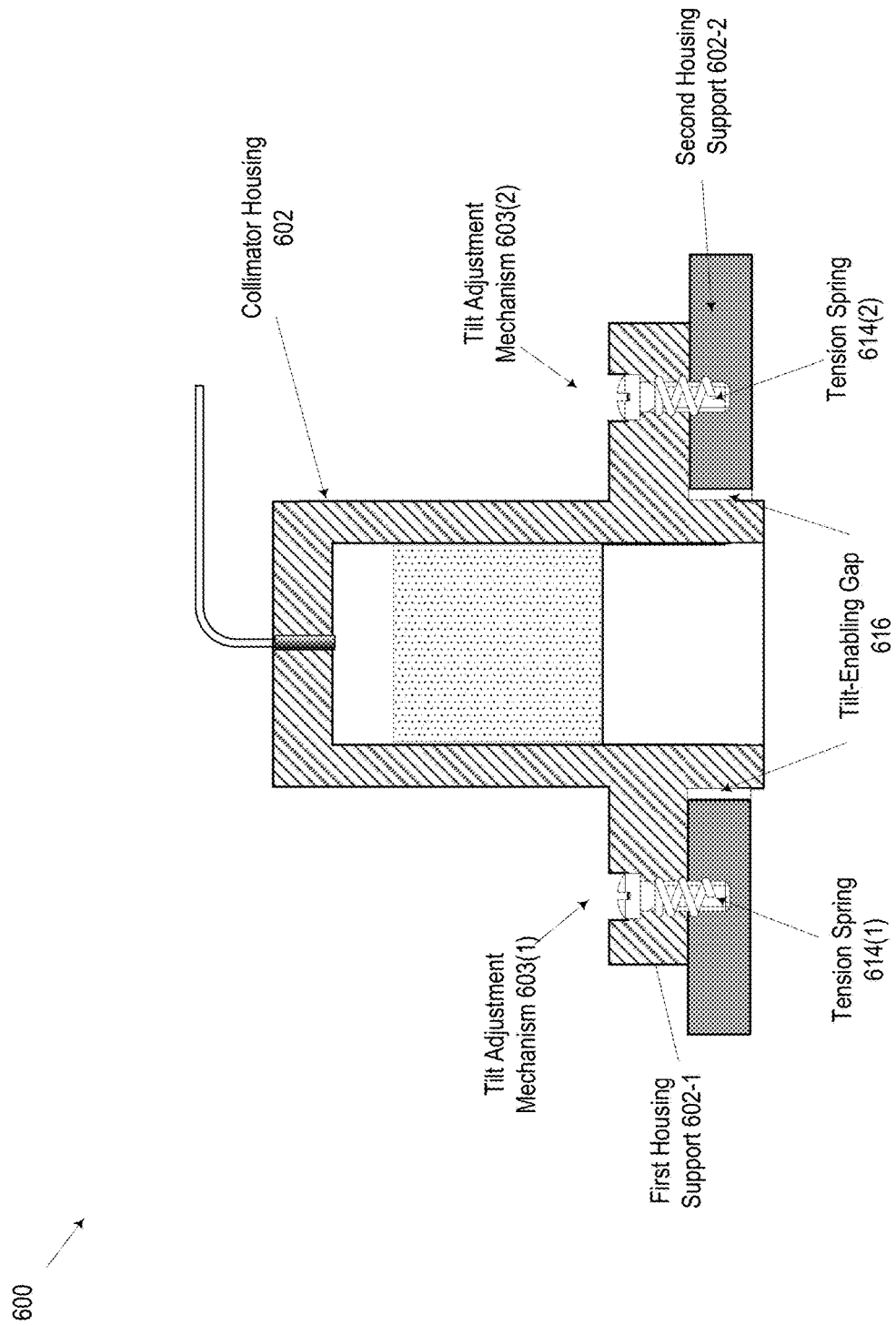
FIG. 6 illustrates schematically a side view of an exemplary collimator assembly having adjustable alignment, in accordance with some implementations of the present disclosure.

FIG. 6 illustrates schematically a side view 600 of an exemplary collimator assembly having adjustable alignment, in accordance with some implementations of the present disclosure. FIG. 6 is not drawn to scale and is intended as a schematic depiction only. Some elements shown in FIG. 6 may be omitted in various implementations. Some additional elements, known to a person skilled in the optical detection technology may not be shown in FIG. 6 for clarity and conciseness, but may actually be present in various implementations. In some implementations, the side view 600 may be of the collimator assembly whose top view 500 is shown in FIG. 5.

As depicted in FIG. 6, in some implementations, the first housing support 602-1 may be rigidly coupled to the collimator housing 602. The second housing support 602-2 may be attached to the process chamber housing (not shown). One or more of the tilt adjustment screws 603 may be operably coupling the first housing support 602-1 to the second housing support 602-2. In some implementations, tension springs 614 are used in conjunction with the adjustment screws 603, in illustrated. In some implementations, the tension springs 614 are positioned at different locations than the locations of the adjustment screws 606. The tension springs 614 may remain in the compressed states so that the total force exerted (upwards) on the first housing support 602-1 is greater (in some implementations, significantly greater) than the total weight of the collimator assembly. Such spring compression may be advantageous to stabilize the first support relative to the second support and prevent the collimator assembly from wobbling during operations of the endpoint detection device. Operations of one or more of the alignment screws 603 may result in a desired tilt of the optical axis of the collimator, similar to operations described in relation to FIG. 4 above.

To accommodate a motion of the first housing support 602-1 relative to the second housing support 602-2, a tilt-enabling gap 616 may be implemented. The tilt-enabling gap 616 may extend symmetrically around a circumference of the housing 602 (if the housing has a cylindrical shape) or may be designed to be asymmetric. When one or more tilt adjustment screws are operated (e.g., by a human operator) and the housing 602 is tilted, as a result, the tilt may be freely allowed until further adjustment is arrested by the body of the housing making a contact with the second housing support 602-2. The amount of the gap 616 may be set to allow a maximum pre-determined tilt. For example, if the height of the second housing support 602-2 near the gap 616 is 0.3 in, the gap of 0.005 may allow up to 1° tilts away from the reference (e.g., vertical) direction (in addition to a full 360° azimuthal tilt).

Figure 7:
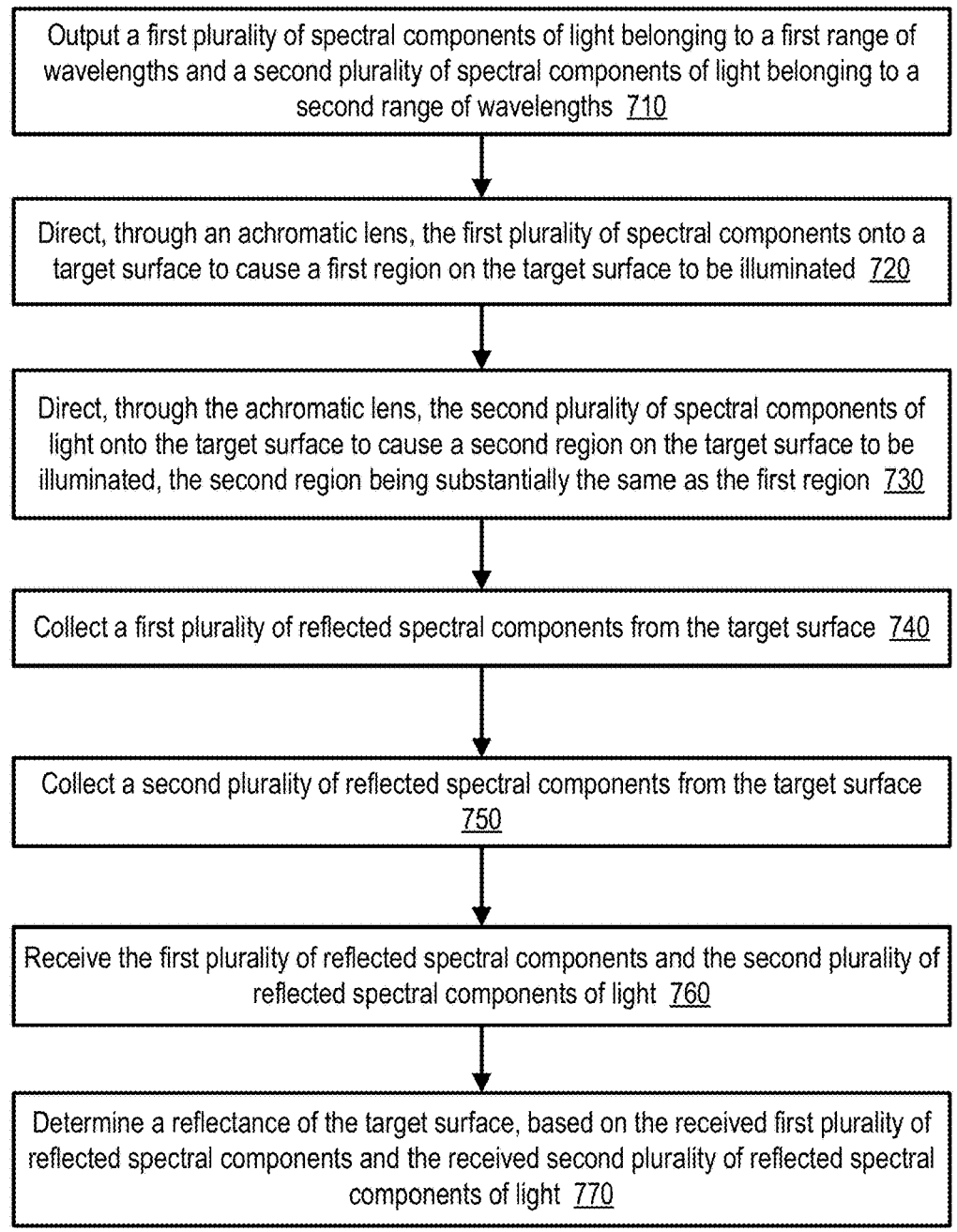
FIG. 7 is a flow diagram of one possible implementation of a method of deploying a broadband collimator assembly for precise optical characterization of targets within a process chamber, in accordance with some implementations of the present disclosure.

FIG. 7 is a flow diagram of one possible implementation of a method 700 of deploying a broadband collimator assembly for precise optical characterization of targets within a process chamber, in accordance with some implementations of the present disclosure. In some implementations, the broadband collimator assembly is spatially adjustable. Method 700 may be performed using systems and components described in FIGS. 1-6 or any combination thereof. Some or all blocks of method 700 may be performed responsive to instructions from the processing device 136, in some implementations. The processing device 136 may be coupled to one or more memory devices 138. In some implementations, method 700 may be performed when a substrate is being processed in the process chamber 102. In some implementations, method 700 may be performed when a calibration device or a reference substrate is in the process chamber 102.

Method 700 may involve outputting, by a source of light, a light signal (operation 710). In some implementations, the processing device (e.g., device 136) causes the source of light to output the light signal. In other implementations, a human operator causes the light signal to be output. The light signal may have a broad spectral distribution (or be a collection of multiple narrow-band distributions). The light signal may include a number of ranges of wavelengths, such as $[\lambda_j-\Delta\lambda_j/2, \lambda_j+\Delta\lambda_j/2]$ where j=1, 2, 3 . . . . Each range may be characterized by its central wavelength $\lambda_j$ and width $\Delta\lambda_j$. Each range may contain a plurality of spectral components. The number of components within each range may be very large or even infinite as the spectral components may be represent a continuum (which may be characterized by a Fourier integral).

At operation 720, method 700 may continue with directing the first plurality of spectral components of light belonging to the interval $[\lambda_1-\Delta\lambda_1/2, \lambda_1+\Delta\lambda_1/2]$ onto a target surface to cause a first region on the target surface to be illuminated. Similarly, at operation 730, method 700 may continue with directing the second plurality of spectral components of light belonging to the interval $[\lambda_2-\Delta\lambda_2/2, \lambda_2+\Delta\lambda_2/2]$ onto the target surface to cause a first region on the target surface to be illuminated. The first plurality of spectral components and the second plurality of spectral components may be delivered, via (one or more) first optical fiber(s), to a broadband collimator. The collimator may have an achromatic lens. After passing through the broadband collimator, the first beam (which can be a collimated beam, a focused beam, or a diverging beam) that includes the first plurality of spectral components may have a substantially the same cross section as the second beam that includes the second plurality of spectral components. As a result, a first region on the target surface (e.g., a substrate being etched or otherwise processed) illuminated by the first beam may be substantially the same as a second region on the target surface illuminated by the second beam. Operations 720 and 730 may be performed in an arbitrary order. In some implementations, operations 720 and 730 may be performed concurrently. In some implementations, operations 720 and 730 may be performed sequentially, one after another.

Each beam directed at the target surface may cause a respective reflected beam to propagate back through the collimator and be received by (one or more) second optical fiber(s), to be transferred to a light detector. More specifically, at operation 740, the first reflected beam (that includes a first plurality of reflected, from the target surface, spectral components of light) may be collected, by the second optical fiber(s). Similarly, at operation 750, the second reflected beam (that includes a second plurality of reflected, from the target surface, spectral components of light) may be collected, by the second optical fiber(s). The first (second) reflected beam may be produced by the first (second) plurality of spectral components of light incident on the target surface. Operations 740 and 750 may be performed in an arbitrary order. In some implementations, operations 740 and 750 may be performed concurrently. In some implementations, operations 740 and 750 may be performed sequentially, one after another.

At operation 760, method 700 may continue with receiving, by a light detector, via the second optical fiber, the first plurality of reflected spectral components of light and the second plurality of reflected spectral components of light. At operation 770, the light detector (in conjunction with the processing device and/memory, in some implementations) may determine a reflectance of the target surface, based on the received first plurality of reflected spectral components of light and the received second plurality of reflected spectral components of light. The reflectance may be determined for the entire width of the first range of wavelengths and the entire second range of wavelengths, in some implementations. In some implementations, additional (e.g., third, fourth, etc.) ranges of wavelengths may additionally be used in a way that is similar to the above-described method, to obtain a more accurate characterization of the target surface. In some implementations, the first range is within a 400-700 nm interval of wavelengths and the second range is outside the 400-700 nm interval of wavelength. In some implementations, the third range is outside the 400-700 nm interval of wavelength and is different from the second range. In some implementations, the second (or third) range is within a 100-400 nm interval and the third (second) range is within a 700-900 nm of wavelengths.

Figure 8:
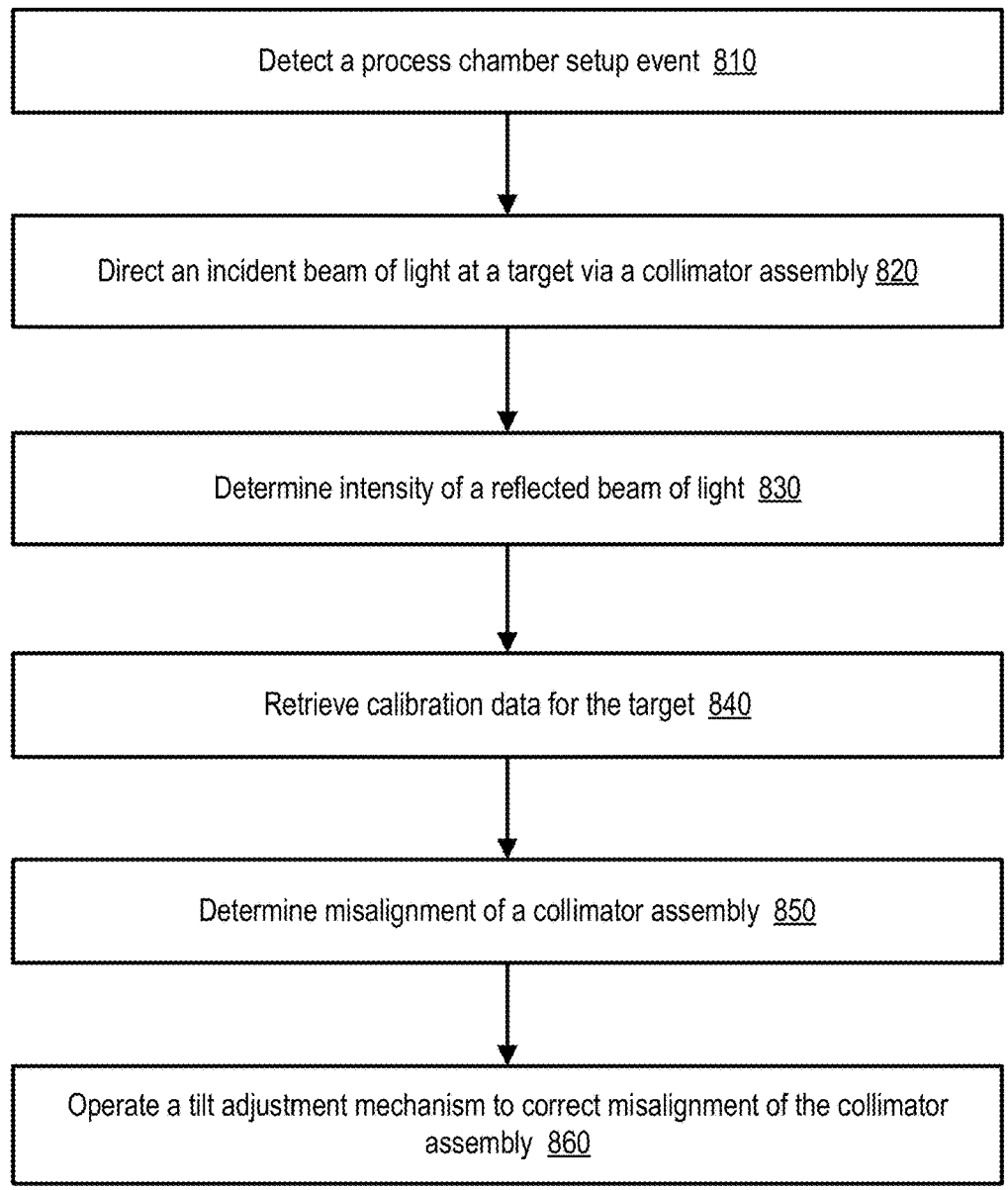
FIG. 8 is a flow diagram of one possible implementation of a method of adjusting tilt of an adjustable collimator assembly for precise optical characterization of targets within a process chamber, in accordance with some implementations of the present disclosure.

FIG. 8 is a flow diagram of one possible implementation of a method 800 of adjusting tilt of an adjustable collimator assembly for precise optical characterization of targets within a process chamber, in accordance with some implementations of the present disclosure. In some implementations, method 800 is performed using systems and components described in FIGS. 1-6 or any combination thereof. Some or all blocks of method 800 may be performed responsive to instructions from the processing device 136, in some implementations.

At operation 810, method 800 may detect a process chamber setup event. For example, the process chamber may have been serviced (e.g., a scheduled or an unscheduled maintenance may have been performed), one or more components of the process chamber may have been replaced, or a collimator assembly may have been moved and coupled to a different chamber. In some implementations, "setup event" may be a setup check event that is not associated with any setup modifications, but may be an indication of a scheduled routine check-up (or a check-up requested by a human operator).

At operation 820, method 800 may continue with outputting an incident beam of light at a target via the (adjustable) collimator assembly. For example, one or more sources of light may produce light beams. The light beams may be delivered (e.g., via one or more input optical fibers) to the collimator assembly and, having, passed through optical components of the collimator assembly, may be directed onto the target. The target may be a calibration device, a reference substrate with known optical properties, or a regular substrate that is about to undergo processing (e.g., etching), provided that the optical properties of such a substrate are known.

The incident beams may cause a reflected beam to be generated by the target. The reflected beam may pass (in reverse direction) through the optical components of the collimator and may be delivered, via one or more output optical fibers, to a light detector. At operation 830, the light detector may determine intensity of the reflected beam. At operation 840, a processing device in communication with the light detector and a memory device, may retrieve, from the memory device, calibration data for the target. In some implementations, the calibration data may include the reflectivity of the target as a function of the angle of incidence of the incident beam. At operation 850, method 800 may continue with the processing device performing a comparison of the intensity data, obtained from the light detector, with the calibration data, retrieved from the memory device. As a result, the processing device may determine a degree of misalignment of the collimator assembly (e.g., because of the performed process chamber setup modification). For example, the reflectivity may decrease (or increase) with the degree of misalignment.

At operation 860, method 800 may output a tilt adjustment value to be applied to the tilt adjustment mechanism of the collimator assembly to correct the determined misalignment of the collimator assembly. The output value may be accessed by a human operator who may correct the alignment of the collimator assembly in view of the output value.

Figure 9:
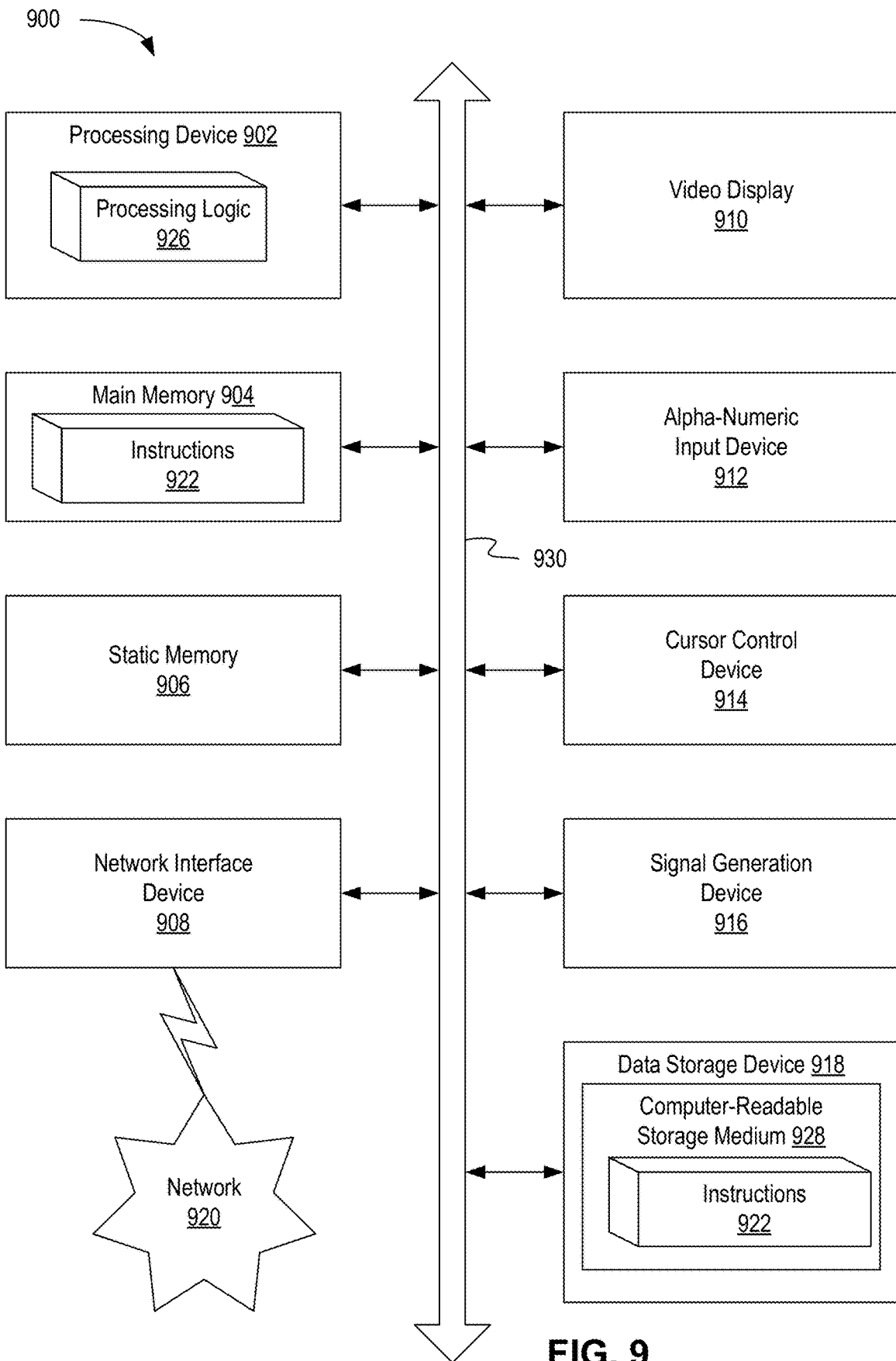
FIG. 9 depicts a block diagram of an example processing system capable of supporting real-time detection of particulate contaminants present inside a deposition chamber, based on light scattering data.

FIG. 9 depicts a block diagram of an example processing device 900 operating in accordance with one or more aspects of the present disclosure. The processing device 900 may be the processing device 136 of FIG. 1, in one implementation. Example processing device 900 may be connected to other processing devices in a LAN, an intranet, an extranet, and/or the Internet. The processing device 900 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 900 may include a processor 902 (e.g., a CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which may communicate with each other via a bus 930.

Processor 902 represents one or more general-purpose processing devices such as a microprocessor, central processing unit, or the like. More particularly, processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 902 may be configured to execute instructions implementing method 700 of deploying a broadband collimator assembly, for precise optical characterization of targets within a process chamber and/or method 800 of adjusting tilt of an adjustable collimator assembly.

Example processing device 900 may further comprise a network interface device 908, which may be communicatively coupled to a network 920. Example processing device 900 may further comprise a video display 910 (e.g., a liquid crystal display (LCD), a touch screen, or a cathode ray tube (CRT)), an alphanumeric input device 912 (e.g., a keyboard), an input control device 914 (e.g., a cursor control device, a touch-screen control device, a mouse), and a signal generation device 916 (e.g., an acoustic speaker).

Data storage device 918 may include a computer-readable storage medium (or, more specifically, a non-transitory computer-readable storage medium) 928 on which is stored one or more sets of executable instructions 922. In accordance with one or more aspects of the present disclosure, executable instructions 922 may comprise executable instructions implementing method 700 of deploying a broadband collimator assembly, for precise optical characterization of targets within a process chamber and/or method 800 of adjusting tilt of an adjustable collimator assembly.

Executable instructions 922 may also reside, completely or at least partially, within main memory 904 and/or within processor 902 during execution thereof by example processing device 900, main memory 904 and processor 902 also constituting computer-readable storage media. Executable instructions 922 may further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element.

"Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A collimator assembly comprising:
   a collimator housing comprising:
      an interface configured to couple to a process chamber; and a port to receive a first optical fiber, wherein the first optical fiber is to deliver, to an enclosure formed by the collimator housing, a plurality of spectral components of light; and an achromatic lens located, at least partially, within the enclosure formed by the collimator housing, the achromatic lens to:
  direct the plurality of spectral components of light onto a target surface disposed within the process chamber.

2. The collimator assembly of claim 1, wherein the plurality of spectral components of light comprises:
  a first set of spectral components within a 400-700 nm interval of wavelengths, wherein the first set of spectral components is to illuminate a first region of the target surface, and
  a second set of spectral components outside the 400-700 nm interval of wavelengths, wherein the first set of spectral components is to illuminate a second region of the target surface, wherein an overlap between the first region and the second region is least 90% of each of the first region and the second region.

3. The collimator assembly of claim 2, wherein the plurality of spectral components of light is at least 300 nm wide.

4. The collimator assembly of claim 1, wherein the port of the collimator housing is further to receive a second optical fiber, wherein the second optical fiber is to:
  collect a plurality of reflected, from the target surface, spectral components of light produced by the plurality of spectral components of light directed onto the target surface; and
  deliver the plurality of reflected spectral components of light to a light detector.

5. The collimator assembly of claim 4, further comprising a conduit to provide access of the first optical fiber and the second optical fiber to the enclosure formed by the collimator housing.

6. The collimator assembly of claim 1, wherein the achromatic lens is frictionally held within the enclosure formed by the collimator housing.

7. The collimator assembly of claim 1, wherein the achromatic lens is a triplet lens.

8. The collimator assembly of claim 1, wherein the plurality of spectral components of light directed onto the target surface by the achromatic lens forms a collimated beam.

9. The collimator assembly of claim 1, further comprising an optically transparent filler that fills at least a part of the enclosure formed by the collimator housing.

10. The collimator assembly of claim 1, wherein the collimator housing further comprises a tilt adjustment mechanism to modify alignment of an axis of the collimator housing relative to the process chamber.

11. The collimator assembly of claim 10, wherein the tilt adjustment mechanism comprises a plurality of adjustment screws, wherein adjustment of each of the plurality of adjustment screws modifies alignment of the axis of the collimator housing.

12. The collimator assembly of claim 10, further comprising a first support rigidly coupled to the collimator housing, a second support rigidly coupled to the process chamber, and a gap between the first support and the second support, wherein the gap is to accommodate a motion of the first support caused by modified alignment of the axis of the collimator housing.

13. The collimator assembly of claim 12, further comprising one or more tension springs to stabilize the first support relative to the second support.

14. An endpoint detection system comprising:
  a source of light to output a plurality of spectral components of light;
  a collimator housing comprising:
    an interface configured to couple to a process chamber; and
    a port to receive a first optical fiber, wherein the first optical fiber is to deliver, to an enclosure formed by the collimator housing, a plurality of spectral components of light;
  an achromatic lens located, at least partially, within the enclosure formed by the collimator housing, the achromatic lens to:
    direct the plurality of spectral components of light onto a target surface disposed within the process chamber;
  a second optical fiber to:
    collect a plurality of reflected, from the target surface, spectral components of light produced by the plurality of spectral components of light directed onto the target surface;
  a light detector to receive, via the second optical fiber, the plurality of reflected spectral components of light; and
  a processing device, communicatively coupled to the light detector, to determine, using the received plurality of reflected spectral components of light, one or more optical characteristics of the target surface.

15. The endpoint detection system of claim 14, wherein the plurality of spectral components of light comprises:
  a first set of spectral components within a 400-700 nm interval of wavelengths, wherein the first set of spectral components is to illuminate a first region of the target surface, and
  a second set of spectral components outside the 400-700 nm interval of wavelengths, wherein the first set of spectral components is to illuminate a second region of the target surface, wherein an overlap between the first region and the second region is least 90% of each of the first region and the second region.

16. The endpoint detection system of claim 14, wherein the achromatic lens is frictionally held within the enclosure formed by the collimator housing.

17. The endpoint detection system of claim 14, wherein the achromatic lens is a triplet lens.

18. The endpoint detection system of claim 14, further comprising:
  a tilt adjustment mechanism to modify alignment of an axis of the collimator housing relative to the process chamber.

19. The endpoint detection system of claim 18, wherein the tilt adjustment mechanism comprises:
  a plurality of adjustment screws, wherein adjustment of each of the plurality of adjustment screws modifies alignment of the axis of the collimator housing; and
  one or more tension springs.

20. A method comprising:
  delivering, through a port in a collimator housing, a plurality of spectral components of light to an achromatic lens;
  directing, through the achromatic lens, the plurality of spectral components of light onto a target surface disposed withing a process chamber;
  collecting, by a second optical fiber, a plurality of reflected, from the target surface, spectral components of light produced by the plurality of spectral components of light directed onto the target surface;

receiving, by a light detector, via the second optical fiber, the plurality of reflected spectral components of light; and determining, by a processing device communicatively coupled to the light detector, using the received plurality of reflected spectral components of light, one or more optical characteristics of the target surface.

* * * * *